INVENTOR.
JOAQUIN MORALES GARCIA
BY Lyon & Lyon
ATTORNEYS 3,551,557
ISOTACTIC POLYPROPYLENE BANDAGES
Joaquin Morales Garcia, Barcelona, Spain, assignor to La Espana Industrial, S.A., Barcelona, Spain, a corporation of Spain
Filed Mar. 16, 1964, Ser. No. 352,199
Claims priority, application Spain, Oct. 9, 1963, 292,641
Int. Cl. A61d 13/00
U.S. Cl. 424—28     2 Claims

ABSTRACT OF THE DISCLOSURE

A bandage comprising a gauze of polypropylene fibers which has been impregnated with a material selected from the group consisting of disinfectants, antiseptics and bacteriocides. The bandage may be prepared by passing the polypropylene gauze through a solution comprising beeswax and a material selected from the group consisting of antiseptics, disinfectants, and bacteriocides. This bandage is nonadherent to wounds and can be reused without danger of infection.

BACKGROUND OF THE INVENTION

Figure 1:
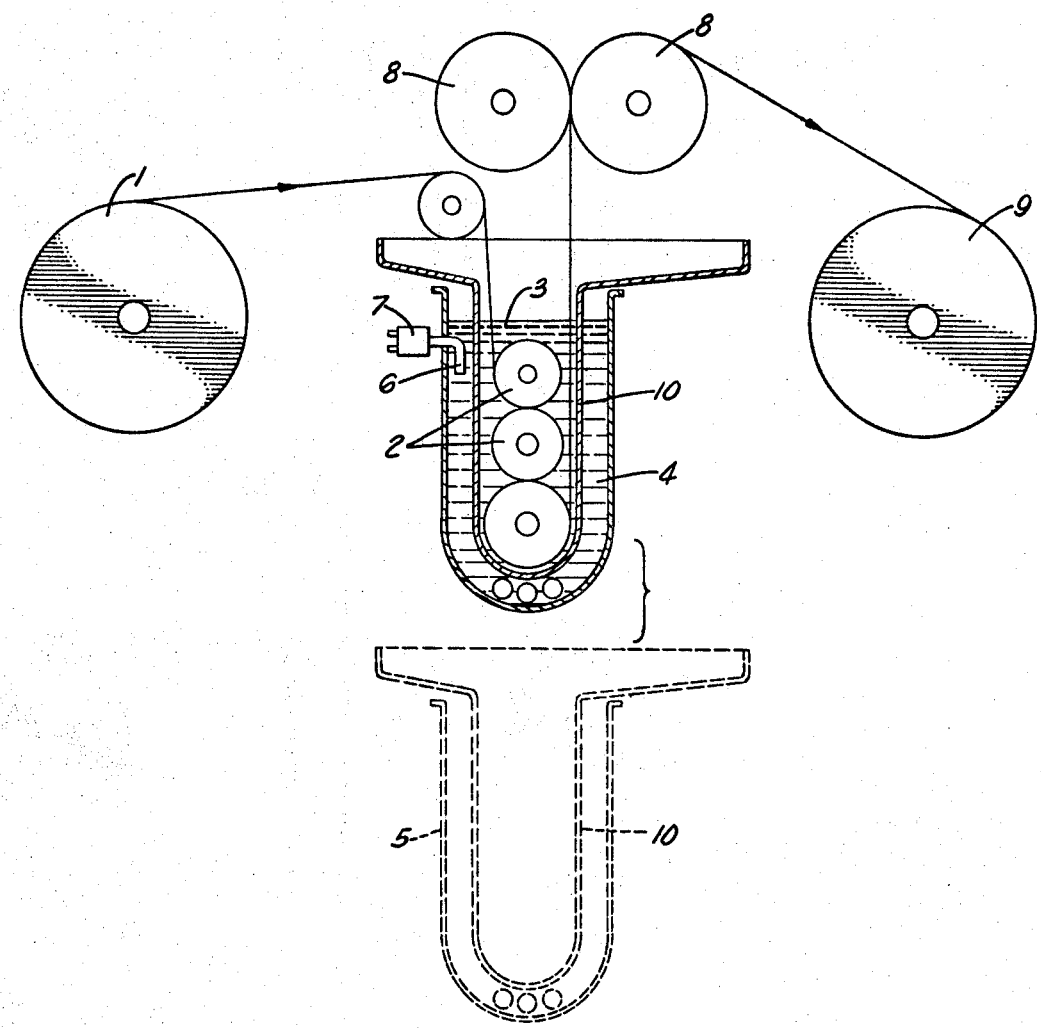

The present invention relates to a new and improved bandage and a process for producing this bandage. More particularly, the present invention relates to a bandage comprising a fabric which will not rot, does not adhere to wounded surfaces during healing, is highly resistant to attack by chemical agents, does not produce allergy or allow the proliferation of fungi or bacteria, and is capable of absorbing medical solutions which will promote healing of the wound. The present invention also relates to impregnated bandages which have been impregnated with such a medical solution and to the process of producing such impregnated bandages.

Bandages, of course, are as old as the healing arts themselves. However, it has long been apparent to the medical profession and others skilled in the bandage art that the various types of bandages which have been used down through the years have been subject to several deficiencies. Primary among these deficiencies has probably been the tendency of these bandages to adhere to the wounds to which they are applied. Often, this adherence has been the result of, or increased by, blood or other secretions emanating from the wound. In addition, it has been found that some prior art bandages caused inflammation of some wounds and are subject to rotting. Thus, it has often been necessary to remove such bandages before the wound has completely healed with the attendant danger of reopening or causing further injury to the wound. Use of such bandages more than once has been considered extremely undesirable because of the great danger of infection which would be raised by an attempt to reuse such bandages. The present invention obviates these difficulties as well as providing additional advantages over prior art bandages.

It is an object of the present invention to provide a bandage produced from a fabric which will not adhere to the wound.

It is another object of the present invention to produce a bandage which may be impregnated with a medical solution and the process of producing such a bandage.

It is a further object of the present invention to provide a bandage made from isotactic polypropylene fibers.

It is still another object of the present invention to provide a bandage comprising isotactic polypropylene which has been impregnated with a disinfectant, antiseptic or bacteriocide composition which has a pH of between about 5.5 and 6 and the process of making this bandage.

Other objects and advantages of the present invention, it is believed, will be apparent from the following detailed description of preferred embodiments thereof when read in connection with the drawing.

Briefly, the bandage of the present invention comprises a fabric or similar material comprising isotactic polypropylene fibers. In a preferred embodiment of the present invention, this bandage is impregnated with a composition having desirable physiological properties. A preferred impregnating composition comprises a beeswax carrier containing an antiseptic, disinfectant or bacteriocide material such as phenol. This impregnating composition may also contain a lubricant or plasticizer such as petroleum jelly such as Vaseline and preferably has a pH of between about 5.5 and 6. Impregnation may be accomplished by dissolving the impregnating material in a suitable solvent such as ethyl alcohol or hydrogen peroxide, impregnating the bandage and removing solvent by evaporation.

Figure 2:
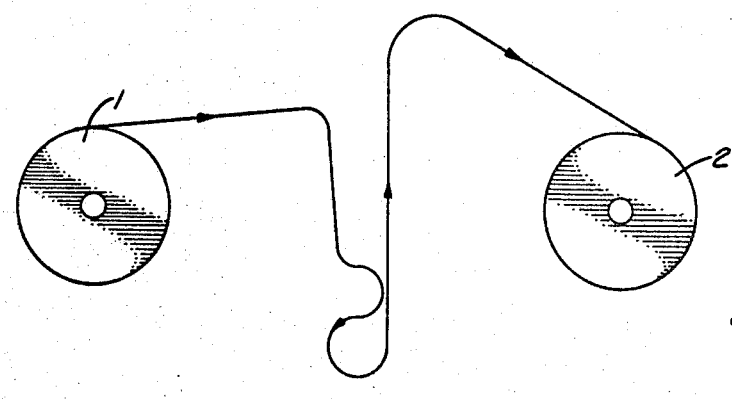

Referring now to the drawing, FIG. 1 of this drawing illustrates an impregnation process coming within the scope of the present invention and an apparatus which may be used in this process. FIG. 2 is a schematic illustration of the path followed by the material to be impregnated as it passes through this apparatus.

As shown in FIG. 1, this apparatus comprises a feed roller 1 from which the material to be impregnated is fed to impregnating rollers 2. Impregnating rollers 2 are situated in impregnating fluid 3 which fluid is held in container 10. A heating medium 4 is contained in jacket 5 which is provided with heating element 6 and thermostat 7 which maintains the heating medium at the desired temperature. Squeeze rollers 8 are positioned above container 10 and function to assure even distribution of the impregnating composition throughout the impregnated material. The impregnated material passing through squeeze rollers 8 is fed to take-up roller 9.

The broken lines in FIG. 1 illustrate the manner in which the heating means comprising container 10 and jacket 5 may be removed from impregnating rollers 2 for the purpose of threading rollers 2, maintenance, or any other reason.

As shown in FIG. 2, the gauze folows a path which passes between and around impregnating rollers 2.

The present invention is further illustrated by the following example:

EXAMPLE

A gauze prepared from isotactic polypropylene fibers and having 20 threads per square centimeter was passed from roller 1 into impregnating solution 3. The composition of this solution was as follows:

Ethyl alcohol (47.5%)—250 cc.
Beeswax—50 gms.
Liquid petroleum jelly such as Vaseline—2.5 gms.
Phenol—1 gm.
Ammonium hydroxide—Drops The pH of the solution was between 5.5 and 6. The temperature of the impregnating solution was about 80° C. and the water in jacket 5 was maintained at a temperature of about 100° C.

After passing between impregnating rollers 2, the impregnated gauze passed between squeeze rollers 8 which functioned to assure uniform distribution of the impregnating material throughout the gauze. It was found that the weight of a square meter of gauze before impregnation was 0.053 kg. and the weight of a square meter of impregnated gauze was 0.063 kg. It was further found that one meter of impregnated gauze having a width of 10 cm. absorbed 33 cc. of solution.

The gauze was dried simply by contact wtih the atmosphere. Rollers 1 and 9 were positively driven and the gauze was maintained under tension during impregnation.

The petroleum jelly such as Vaseline in the impregnating solution functions as a lubricant or plasticizer for the impregnated bandage. It has been found that in the absence of such a plasticizer, the impregnated gauze is too rigid for some uses. Other compatible plasticizers or lubricants may be used.

The ammonium hydroxide functions to maintain the pH within a range of from about 5.5 to about 6. Substantially any other base e.g., sodium hydroxide, calcium hydroxide, etc., may be used to maintain the pH within this range. It has been found that this pH range has a disinfectant power and it is considered that the pH must be maintained within this range in order to obtain the maximum benefits of the present invention.

The phenol functions as an antiseptic. It will be readily apparent to those skilled in the art that substantially any antiseptic, disinfectant, antibiotic or the like which is suitable for the treatment of wounds or the like may be used in appropriate amount in place of phenol. For example, iodine is contemplated for use in the present invention.

It will be readily apparent to those skilled in the art that solvents other than the hot alcohol of the example may be used to prepare the impregnating solution. For example, chloroform, benzene, ether, or carbon disulfide may be used. In general any solvent which will effectively dissolve the beeswax carrier may be used.

It has been found that the bandages of the present invention may be used for all types of fixation bandages, can be reused an indeterminate number of times without damage, produce no intolerance or allergy of any kind and have an anti-inflammatory power. Furthermore, these bandages can be molded on every part of the human body thereby permitting movement while isolating the injured member. These bandages may also be used in surgery as external dressings of every kind for wounds, burns, scalds, ulcers, etc., since they allow suppuration therethrough without any tendency to stick or adhere to the wound. Thus, the bandage of the present invention accelerates the process of healing. It is also highly resistant to rot and highly haemostatic.

As clearly established by the foregoing description, the present invention provides a surgical dressing that may be applied both quickly and surely but will cause no discomfort to the user while wearing it and, particularly, when it is separated from the wound.

Having fully described the present invention, it is to be understood that it is not to be limited to the details set forth, but is of the full scope of the appended claims.

What is claimed is:

1. A bandage comprising a gauze of isotactic polypropylene fibers, said bandage being impregnated with beeswax and an effective wound-treating amount of a phenol solution having a pH from about 5.5 to about 6.

2. A bandage comprising a gauze of isotactic polypropylene fibers, said bandage being impregnated with about 50 parts by weight beeswax, 2.5 parts by weight petroleum jelly, and 1 part by weight phenol, said parts by weight being based on the total amount of impregnating material, said impregnating material having a pH in the range of from about 5.5 to about 6.

References Cited

UNITED STATES PATENTS

| 2,773,000 | 12/1956 | Masci | 167—84 |
| 3,098,692 | 7/1963 | Gagliardi | 117—138.8E |
| 3,140,194 | 7/1964 | Gagliardi | 117—138.8E |
| 3,166,608 | 1/1965 | Natta | 117—138.8E |
| 3,286,322 | 11/1966 | Sneary | 117—138.8E |
| 3,336,923 | 8/1967 | Devaud | 128—156 |

OTHER REFERENCES

Modern Plastic Encyclopedia, vol. 40, No. A, September 1962, p. 263.

STANLEY J. FRIEDMAN, Primary Examiner

U.S. Cl. X.R.

117—138.8; 128—156